US006451755B1

(12) United States Patent
Norman

(10) Patent No.: US 6,451,755 B1
(45) Date of Patent: Sep. 17, 2002

(54) STABLE AQUEOUS SILANE SOLUTIONS FOR CLEANING HARD SURFACES

(75) Inventor: Clare L. Norman, Egham (GB)

(73) Assignee: S. C. Johnson & Son, Inc., Racine, WI (US)

( * ) Notice: Subject to any disclaimer, the term of this patent is extended or adjusted under 35 U.S.C. 154(b) by 0 days.

(21) Appl. No.: 09/564,258

(22) Filed: May 4, 2000

Related U.S. Application Data

(63) Continuation of application No. 09/142,323, filed as application No. PCT/US97/02879 on Jan. 25, 1999, now Pat. No. 6,087,319.

(30) Foreign Application Priority Data

Mar. 4, 1996 (GB) ............................................. 9604623

(51) Int. Cl.[7] ............................ C11D 3/43; C11D 3/22; C08K 5/54

(52) U.S. Cl. ....................... 510/466; 510/273; 510/382; 510/405; 510/470; 510/505; 106/287.1

(58) Field of Search ................................ 510/466, 273, 510/382, 405, 470, 505; 106/287.1

(56) References Cited

U.S. PATENT DOCUMENTS

| | | | | |
|---|---|---|---|---|
| 4,005,025 A | | 1/1977 | Kinstedt | 252/89 R |
| 4,167,488 A | | 9/1979 | Murtaugh | 252/160 |
| 5,411,585 A | | 5/1995 | Avery et al. | 106/287.1 |
| 5,418,006 A | | 5/1995 | Roth et al. | 427/154 |
| 5,759,980 A | | 6/1998 | Russo et al. | 510/241 |
| 6,087,319 A | * | 7/2000 | Norman | 510/468 |
| 6,214,781 B1 | * | 4/2001 | Gambogi et al. | 510/218 |

FOREIGN PATENT DOCUMENTS

| | | | |
|---|---|---|---|
| EP | 0 444 267 A2 | | 12/1990 |
| EP | WO 92/14810 | * | 9/1992 |
| EP | WO 94/12259 | * | 6/1994 |
| WO | WO 92/14810 | | 11/1991 |
| WO | WO 94/12259 | | 6/1994 |

* cited by examiner

*Primary Examiner*—Mark Kopec
*Assistant Examiner*—Brian P. Mruk

(57) ABSTRACT

A method of improving the storage stability and broadening the pH stability of an aqueous solution containing a water soluble organosilane is disclosed. The method comprises including within the solution an amount of a saccharide surface active agent selected from the group consisting of alkyl saccharides and alkenyl-saccharides, wherein the amount of saccharide surface active agent is effective to improve the storage stability of and to broaden the pH stability of the resulting solution.

20 Claims, No Drawings

STABLE AQUEOUS SILANE SOLUTIONS FOR CLEANING HARD SURFACES

This application is a continuation of U.S. patent application Ser. No. 09/142,323 filed Jan. 25, 1999, U.S. Pat. No. 6,087,319, which is a 371 of PCT/US97/02879, filed Feb. 24, 1997.

This invention relates to a method of stabilizing aqueous organosilane/fluoroorganosilane solutions containing silicon bonded hydrolysable groups.

BACKGROUND ART

Aqueous organo/fluoroorganosilanes solutions containing silicon bonded hydrolysable groups have several uses. The hydrolysable groups enable such compounds to irreversibly attach themselves to substrates containing hydroxyl or other silicone reactive species.

The significance of this 'tethering' action, in this instance, is to retard re-soiling, impart shine and make easier to clean a variety of bathroom surfaces such as enamel, plastic and porcelain, also giving residual antimicrobial/algicidal activity.

It is desirable that the 'tethering' agent is delivered via a predominately aqueous media with minimal solvent content.

SUMMARY OF THE INVENTION

Studies undertaken by the present inventor in order to accomplish the above purpose revealed that the use of one or more non-ionic surface active agents, one of which should be an alkyl saccharide, together with a silane derivative produced an improved detergent composition which helps to prevent re-soiling, gives residual antimicrobial/algicidal properties and residual 'Shine' characteristics. Accordingly, in one embodiment the subject invention provides a solution as defined in claim 1 comprising an alkyl saccharide surface active agent and a silane derivative, and in another embodiment the subject invention is directed to use of said alkyl saccharide in storage stable compositions.

Hard surface cleaning can be achieved with the composition of the subject invention in the absence of water soluble organic quaternary ammonium compounds contrary to the disclosure in a previously published patent U.S. Pat. No. 5,411,585. The composition, instead, stabilizes the organosilane/fluoroorganosilane by the use of saccharides sometimes with an additional non-ionic co-surfactant. For environmental reasons the absence of ammonium quaternary compounds is desired.

Other and further objects, features and advantages of the invention will appear more fully from the following description.

DETAILED DESCRIPTION

All amounts given herein (in the absence of a statement of the contrary) are given as amounts by weight of the total amount of the aqueous solution of the subject invention.

Organosilanes which can be used in the invention are disclosed in reference U.S. Pat. No. 5,411,585.

The organosilanes having hydrolysable groups which are useful in this invention form clear solutions in water at room temperature (20° C.) at least to the extent of the active concentration level to be used in the aqueous solutions. Examples of such organosilanes are methyltrimethoxysilane, 3-(trimethoxysilyl) propyldimethyl-octadecyl ammonium chloride and 3-(trimethoxysilyl)propyl-methyldi(decyl)ammonium chloride. We have found that compounds which do not give clear solutions in water at 20° C., such as 3-(triethoxysilyl) propoyldimethyloctadecyl ammonium chloride are not useful in the present invention.

As mentioned above, the aqueous organosilane/fluoroorganosilane solutions of the subject invention are stable solutions. Stable solutions are clear solutions which do not show haze.

Preferably said solutions are storage stable, i.e. said solutions are clear and non-hazy after storage.

More preferably said storage stable solutions are clear and non-hazy after storage at room temperature (20° C.) for 6 months, even more preferably after such storage for 1 year.

Preferably said organosilanes have structural formula $$A_{3-x}B_xSiD \qquad (1)$$

wherein each

A is —OH or a hydrolysable group,

B is an alkyl group of from 1 to 4 carbon atoms, x has a value of 0, 1 or 2, and D is a hydrocarbon group of from 1 to 4 carbon atoms, a fluoro substituted (otherwise substituted or unsubstituted) hydrocarbon group, phenyl, or a non-ionic or cationic, substituted-hydrocarbon group containing at least one oxygen or nitrogen group or salts of such substituted-hydrocarbon groups.

In the above formulas, A is —OH or a hydrolysable group such as a halide like —Cl, —Br and —I, alkoxy or alkoxyether such as those of the formula $—OR^1$ and $—OR^{2A}OR^1$ where each $R^1$ is $R^2$ or hydrogen, $R^2$ is an alkyl group of from 1 to 4 carbon atoms such as methyl, ethyl, propyl, butyl or $—CH_2CH_2CH_2(CH_3)$, with methyl being preferred, and $R^{2A}$ is a divalent saturated hydrocarbon group of from 1 to 4 carbon atoms such as methylene, ethylene, propylene, butylene or $—CH_2CH_2CH(CH_3)—$ with ethylene and propylene being preferred; amino such as $—N(R^1)_2$ such as $—NHCH_3$, $—N(CH_3)_2$ and $—N(CH_2CH_2)_2$, also including organosilazanes where two organosilanes are combined by a —NH— unit; acetoxy which is $—OOCCH_3$; acetamido which is $—HNOCCH_3$; and hydride which is —H, among others known in the art. B is $R^2$ with methyl being preferred.

D is a hydrocarbon group such as $R^2$, vinyl, allyl, phenyl, fluoro substituted (otherwise unsubstituted or substituted) hydrocarbon and nonionic or cationic, substituted-hydrocarbon groups containing at least one oxygen or nitrogen group as well as salts of such substituted-hydrocarbon groups. Examples where D is a fluoro substituted (otherwise unsubstituted or substituted) hydrocarbon group include perfluoroalkylsulphonamide N—G—$C_4$ alkylene silanes. Examples of the latter substituted-hydrocarbon groups include $$—R^3N(R^4)_yH_{2-y}—R^3N^{(+)}(R^4)_yH_{3-y}X^{(-)}.$$

$$—R^3NHR^3(R^4)_yH_{2-y}—R^3NHR^3N^{(+)}(R^4)_yH_{3-y}X^{(-)}$$

$$—R^3N^{(+)}R^2R^4R^5X^{(-)}.$$

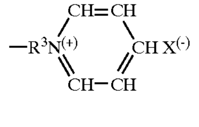

and $—R^3Q$ where Q represents a functional group, optionally with further alkyl or aryl chains, such as alcohols and ethers such as $—(OCH_2CH_2)_zOR^1$ where z has a value of from 0 to about 50, esters or amides such as $—COOR^6$, $—CONHR^6$, $—HNOCR^6$ or $—OOCCH(R^6)_3H_{1-3}CHCH_2$ where $R^6$ is an alkyl group of 1 to 18 carbon atoms such as methyl, ethyl, butyl, octyl and octadecyl with methyl being preferred and s is 0 or 1, glycidoxy such as $—OCH_2CHOCH_2$ as well as other nonionic or cationic substituted-hydrocarbon groups known in the art. In the above formulas, x has a value of 0, 1 or 2 with values of 0 or 1 being preferred, and with x having a value of 0 being most preferred; y has a value of 0, 1 or 2; $R^3$ is a divalent saturated hydrocarbon group of from 1 to 12 carbon atoms such as $R^{2A}$, $—(CH_2)_6—$, $—(CH_2)_8—$, and $—(CH_2)_{12}—$; $R^4$ and $R^5$ are each selected from the group consisting of alkyl groups of 1 to 18 carbon atoms, $—CH_2C_6H_5$, $—CH_2CH_2OH$ and $—CH_2OH$. $R^6$ is an alkyl group of 1 to 18 carbon atoms. One example of $—R^3Q$ is glycidoxypropyl or $—(CH_2)_3OCH_2CHOCH_2$. X is an anion and more preferably, is selected from chloride, bromide, fluoride, iodide, acetate, methosulfate, ethosulfate, phosphate or tosylate anions and most preferably, X is a chloride anion.

In Formula II above, $R^4$ and $R^5$ are preferably alkyl groups of from 1 to 18 carbon atoms and more preferably, $R^2$ is a methyl group with the total number of carbon atoms in $R^3$, $R^4$ and $R^5$ being at least 12 if antimicrobial properties are desired from the organosilane. In one preferred organosilane of Formula II, $R^3$ is a propylene, $R^2$ and $R^4$ are each methyl groups and $R^5$ is an octadecyl group while in another alternative preferred organosilane of Formula II, $R^2$ is a methyl group and $R^4$ and $R^5$ are each decyl groups.

The most preferred compounds for use in the present invention are $(CH_3O)_3SiR^2$, particularly where $R^2$ is methyl, $(CH_3O)_3SiCH{=}CH_2$, $(CH_3)_3SiCH_2CH{=}CH_2$, $(CH_3O)_3SiCH_2CH_2CH_2OCH_2CHOCH_2$, $(CH_3O)_3SiR^2N(R^4)_yH_{2-y}$, $(CH_3O)_3SiR^3N^{(+)}(R^4)_yH_{3-y}X^{(-)}$, $(CH_3O)_3SiR^3NHR^3N(R^4)_yH_{2-y}$, $(CH_3O)_3SiR^3NHR^3N(R^4)_yH_{3-y}X^{(-)}$,

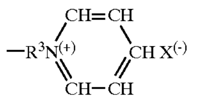

where $R^3$ is propylene and of the nitrogen-functional organosilanes, the most preferred are 3-(trimethoxysilyl)-propyldimethyloctadecyl ammonium chloride having the formula $$(CH_3O)_3Si(CH_2)_3N^{N(+)}(CH_3)_2C_{18}H_{37}Cl^{(-)}$$

and 3-(trimethoxysilyl)propylmethyldi(decyl)ammonium chloride which has the formula $$(CH_3O)_3Si(CH_2)_3{}^{N(+)}CH_3(C_{10}H_{21})_2Cl^{(-)}$$

Preferably the organosilane is present in the aqueous solution in an amount of from 0.001% to 5% by weight of the aqueous solution, more preferably from 0.01% to 2% by weight of the aqueous solution and even more preferably from 0.05% to 0.5% of weight of the aqueous solution.

Alkylsaccharides are well known in the art. They are sugar derivatives in which the hydroxyl group attached to carbon 1 is substituted by an alkyl group. Alkylsaccharides describe compounds whatever the constituent sugar whereas alkyl glucosides describe compounds which contain glucose as the sugar.

A typical alkylsaccharide surface active agent which can be used in the present invention is that represented by following formula III $$R_{10}—O—(R_{12}O)_t—(G)_p \qquad \text{III}$$

wherein $R_{10}$ is a linear or branched alkyl, alkenyl or alkylphenyl group having 6–18 carbon atoms, $R_{12}$ is an alkylene group having 2–4 carbon atoms, G is a reduced saccharide residue having 5–6 carbon atoms, t is a value of 0–10, and p is a value of 1—10.

Among alkylsaccharides represented by formula III, those having an alkyl group of $C_{6-18}$, especially of $C_{8-14}$, more especially $C_{8-10}$ for $R_{10}$ such as octyl, decyl or lauryl are preferable. t in formula III which indicates the condensation degree of alkyleneoxide, is a value of 0–10, preferably 0–4, and most preferably 0. G in formula III, which is the basic unit of the hydrophilic portion of the alkylsaccharide, is a reduced saccharide residue having 5–6 carbon atoms. Glucose, galactose and fructose are preferable reduced saccharide residues. The average polymerization degree of saccharide indicated by p in formula III is 1–10, and preferably 1–4.

Alkylsaccharides are more easily biodegradable than other known stabilizers.

Preferably the alkylsaccharide is present in an amount of from 0.001 to 5 wt. % of the aqueous solution, more preferably 0.1–3 wt. % of the aqueous solution, even more preferably 0.6 to 2.5 wt. % of the aqueous solution.

Optionally said alkyl saccharide can be present in combination with a nonionic surfactant.

Suitable nonionic surfactants can be alkoxylated alcohol nonionic surfactants which can be readily made by condensation processes. A great variety of such alkoxylated alcohols especially ethoxylated and/or propoxylated alcohols are also conveniently commercially available. Surfactants catalogues are available which list a number of surfactants, including nonionics.

Preferred alkoxylated alcohols are nonionic surfactants according to the formula $R_{15}O(E)e(P)kH$ where $R_{15}$ is a hydrocarbon chain of from 2 to 24 carbon atoms, E is ethylene oxide and P is propylene oxide, and e and k which represent the average degree of respectively ethoxylation and propoxylation, are of from 0 to 24. The hydrophobic moiety of the nonionic compound can be a primary or secondary, straight or branched alcohol having from 8 to 24 carbon atoms are more preferably 7–9 carbon atoms. More preferred nonionic surfactants for use in the compositions according to the invention are the condensation products of ethylene oxide with alcohols having a straight alkyl chain, having from 6 to 22 carbon atoms, wherein the degree of ethoxylation is from 1 to 15, preferably from 5 to 12. Yet more preferred nonionic surfactants for use in the composition according to the subject invention are the condensation products of 4 moles of ethylene oxide with 1 mole of straight-chain $C_7$–$C_9$ alkyl alcohol, i.e. nonionic surfactants according to the above formula where $R_{15}$ is a straight-chain $C_7$–$C_9$ alkyl group; where p is zero and where e is four.

Preferably the nonionic surfactant is present in an amount of 0.001 to 2 wt. % of the aqueous solution, more preferably in an amount of 0.5 to 1.0 wt. % of the aqueous solution.

The ratio of the alkyl saccharide to the nonionic surfactant is most preferably 1:0.7.

In a particular preferred embodiment of the subject invention a synergistically stabilizing effect is achieved with a combination of the said alkyl saccharide and said nonionic surfactant.

Optionally, from 0.1 to 25% by weight of the total aqueous solution can be water soluble solvents such as butyl carbitol, dipropylene glycol monomethylether, propylene glycol, carbitol, methoxypropanol, glycerine, isopropanol and ethanol. Preferably, methanol is avoided, although the methanol present in commercially available solutions of quaternary ammonium functional organosilanes is well tolerated by the aqueous solutions prepared by the method of the present invention.

Optionally, other ingredients which are compatible with the water soluble organosilanes and surfactants may be included such as from 0.1% to 5% based upon the total weight of aqueous solution of a thickening agent such as hydroxyethyl cellulose, xanthan gum, or conventional thickening agent. Particulate additives such as silica and other high surface area particles are to be avoided since the organosilane may deposit on such particles and thus remove it from the aqueous solutions. Similarly conventional additives such as perfumes, dyes, buffering agents, water soluble metal salts, detergent builders, chelating agents such as EDTA and salts thereof, can be included in the aqueous solutions of the present invention provided that they are compatible with the other ingredients present.

Organo/fluoro-organosilane solutions should preferably be freshly prepared before use in the methods and compositions of the subject invention to prevent loss of activity. The pH of the solutions of the subject invention can be adjusted across a wide range for example from about pH 1 to pH 13-5. However a pH range of 2–10 is preferred and a pH range of 2–5.5 is more preferred.

The pH of the aqueous solution can be adjusted in the appropriate range using an appropriate organic or inorganic acid such as citric acid, acetic acid, hydrochloric acid, phosphoric acid or sorbic acid or an appropriate organic or inorganic base such as sodium hydroxide, ammonium hydroxide dimethyl amine and ethanol amine.

The advantage of the compositions and methods of the present invention is that the aqueous solutions of the water-soluble organosilanes are stable under a much wider range of pH than is presently known in the art. For example, the art teaches that aqueous solutions of alkyl silanes can be brought to a pH of 3.5 to 5.0 using acetic acid, preferably to pH 3.5, but the solutions are said to form insoluble products which render the solutions hazy at which time the solutions should be discarded. Aqueous solutions made according to the present invention have a much longer useful life.

Some exemplary compositions according to the subject invention are now provided.

EXAMPLE 1

The following hard surface cleaning composition was prepared.

| Raw Material | % Wt./Wt. |
|---|---|
| Water | 83.480 |
| Lactic Acid, 80% | 7.480 |
| Urea | 2.000 |
| Dipropylene Glycol Methyl Ether | 4.050 |
| Alkylsaccharide (Glucopon ® 215 CS UP)[1] 60% solution | 2.500 |
| 3(trimethoxysilyl)-propyl-dimethyloctadecyl-ammonium chloride at 72% activities level in methanol diluted to 60% activity level (Dow Corning ® 5772) | 0.240 |
| Fragrance | 0.250 |
| | 100.000 |

EXAMPLE 2

The following hard surface cleaning composition was prepared:

| Raw Material | % Wt./Wt. |
|---|---|
| Water | 83.480 |
| Lactic Acid, 80% | 7.480 |
| Urea | 2.000 |
| Dipropylene Glycol Methyl Ether | 4.050 |
| Alkylsaccharide (Glucopon ® 215 CS UP)[1] 60% solution | 2.500 |
| 1-octanesulfonamide N-ethyl 1,1,2,2,3,3,4,4,5,5,6,6,7,7,8,8,8,Heptadeca-fluoro trimethoxysilane 60% solution (3M) | 0.240 |
| Fragrance | 0.250 |
| | 100.000 |

EXAMPLE 3

The following hard surface cleaning composition was prepared:

| Raw Material | % Wt./Wt. |
|---|---|
| Water | To balance |
| Lactic Acid, 80% | 7.480 |
| Urea | 2.000 |
| Dipropylene Glycol Methyl Ether | 4.050 |
| Alkylsaccharide used in Example 1 | 1.130 |
| Ethoxylated alcohol (Dehydol ®)[2] | 0.870 |
| Organosilane as used in Example 1 | 0.240 |
| | 100.000 |

EXAMPLE 4

The following hard surface cleaning composition was prepared:

| Raw Material | % Wt./Wt. |
|---|---|
| Water | To balance |
| Lactic Acid, 80% | 7.480 |
| Urea | 2.000 |
| Dipropylene Glycol Methyl Ether | 4.050 |
| Alkylsaccharide used in Example 1 | 1.130 |
| Ethoxylated alcohol (Dehydol ®)[2] | 0.870 |
| Fluoroorganosilane as used in Example 2 | 0.240 |
| | 100.000 |

FOOTNOTES TO EXAMPLE 1–4

1. Glucopon® 215 CS UP is available from Henkel Organics.

2. Dehydol® is also available from Henkel Organics.

The solutions of Examples 1–4 were tested for storage stability. The results are shown in Table 1 below. "C" shows that the solution was clear and non-hazy after the storage.

TABLE 1

| Composition of Example | Condition of solution after storage at 20° C. for six weeks | Condition of solution after storage at 40° C. for six weeks |
|---|---|---|
| 1 | C | C |
| 2 | C | C |
| 3 | C | C |
| 4 | C | C |

I claim:

1. A method of improving the storage stability and broadening the pH stability of an aqueous solution containing from about 0.001% to 5% by weight based on the total weight of the solution of a water soluble organosilane having the formula $A_{3-x}B_xSiD$, wherein A is —OH or a hydrolyzable group, B is an alkyl group of from 1 to 4 carbon atoms, x has a value of 0, 1 or 2, and D is a hydrocarbon group of from 1 to 4 carbon atoms, a fluoro substituted (otherwise substituted or unsubstituted) hydrocarbon group, phenyl, or a nonionic or cationic, substituted-hydrocarbon group containing at least one oxygen or nitrogen group or salts of such substituted-hydrocarbon groups, the method comprising:

including within the solution from 0.001% to 5% by weight based on the total weight of the solution of a saccharide surface active agent selected from the group consisting of alkyl saccharides and alkenyl-saccharides, wherein quaternary ammonium compounds are not included within the solution, and wherein the saccharide surface active agent is effective to improve the storage stability of and to broaden the pH stability of the resulting solution.

2. The method of claim 1 wherein:

A is selected from the group consisting of —X, —$OR^1$, —$OR^{2A}OR^1$, —$N(R^1)_2$, —$OOCCH_3$, —$HNOCCH_3$, and —H, where X is a halide, $R^1$ is $R^2$ or hydrogen, $R^2$ is an alkyl group of 1 to 4 carbon atoms, and $R^{2A}$ is a divalent saturated hydrocarbon group of from 1 to 4 carbon atoms.

3. The method of claim 1 wherein:

the saccharide surface active agent has the formula:

$$R_{10}—O—(R_{12}O)_t—(G)_p$$

wherein $R_{10}$ is a linear or branched alkyl, alkenyl or alkyl-phenyl group having 6–18 carbon atoms, $R_{12}$ is an alkylene group having 2–4 carbon atoms, G is a reduced saccharide residue having 5–6 carbon atoms, t is 0–10, and p is 1–10.

4. The method of claim 1 further comprising:

including within the solution a non-ionic surfactant other than a saccharide.

5. The method of claim 4 wherein:

the non-ionic surfactant is included within the solution in an amount of from about 0.001% to 2% by weight.

6. The method of claim 4 wherein:

the ratio of the saccharide surface active agent to the non-ionic surfactant is 1:0.7.

7. The method of claim 4 wherein:

the non-ionic surfactant is an alkoxylated alcohol.

8. The method of claim 1 further comprising:

including within the solutionan acid or a base in a sufficient amount to obtain a solution pH of from about 1 to about 13.5.

9. The method of claim 1 further comprising:

including within the solutionan acid or a base in a sufficient amount to obtain a solution pH of from about 1 to less than 7.

10. A method of improving the storage stability and broadening the pH stability of an aqueous solution containing from about 0.001% to 5% by weight based on the total weight of the solution of a water soluble organosilane having the formula $A_{3-x}B_xSiD$, wherein A is —OH or a hydrolyzable group, B is an alkyl group of from 1 to 4 carbon atoms, x has a value of 0, 1 or 2, and D is a hydrocarbon group of from 1 to 4 carbon atoms, a fluoro substituted (otherwise substituted or unsubstituted) hydrocarbon group, phenyl, or a nonionic or cationic, substituted-hydrocarbon group containing at least one oxygen or nitrogen group or salts of such substituted-hydrocarbon groups, the method comprising:

including within the solution a. from 0.001% to 5% by weight of a saccharide surface active agent selected from the group consisting of alkyl saccharides and alkenyl-saccharides wherein the saccharide surface active agent has the formula:

$$R_{10}—O—(R_{12}O)_t—(G)_p$$

wherein $R_{10}$ is a linear or branched alkyl, alkenyl or alkyl-phenyl group having 6–18 carbon atoms, $R_{12}$ is an alkylene group having 2–4 carbon atoms, G is a reduced saccharide residue having 5–6 carbon atoms, t is 0–10, and p is 1–10, and b. from 0.001% to 2% by weight of a non-ionic surfactant other than a saccharide.

11. The method of claim 10 wherein:

A is selected from the group consisting of —X, —$OR^1$, —$OR^{2A}OR^1$, —$N(R^1)_2$, —$OOCCH_3$, —$HNOCCH_3$, and —H, where X is a halide, $R^1$ is $R^2$ or hydrogen, $R^2$ is an alkyl group of 1 to 4 carbon atoms, and $R^{2A}$ is a divalent saturated hydrocarbon group of from 1 to 4 carbon atoms.

12. The method of claim 10 wherein:

the reduced saccharide residue is glucose, galactose or fructose.

13. The method of claim 10 wherein:

quaternary ammonium compounds are not included within the solution.

14. The method of claim 10 wherein:

the ratio of the saccharide surface active agent to the non-ionic surfactant is 1:0.7.

15. The method of claim 10 wherein:

the non-ionic surfactant is an alkoxylated alcohol.

16. The method of claim 10 further comprising:

including within the solution an acid or a base in a sufficient amount to obtain a solution pH of from about 1 to about 13.5.

17. The method of claim 10 further comprising:

including within the solutionan acid or a base in a sufficient amount to obtain a solution pH of from about 1 to less than 7.

18. A method of improving the storage stability and broadening the pH stability of an aqueous solution containing from about 0.001% to 5% by weight based on the total weight of the solution of a water soluble organosilane having the formula $A_{3-x}B_xSiD$, wherein A is —OH or a hydrolyzable group, B is an alkyl group of from 1 to 4 carbon atoms, x has a value of 0, 1 or 2, and D is a hydrocarbon group of from 1 to 4 carbon atoms, a fluoro substituted (otherwise substituted or unsubstituted) hydrocarbon group, phenyl, or a nonionic or cationic, substituted-hydrocarbon group containing at least one oxygen or nitrogen group or salts of such substituted-hydrocarbon groups, the method comprising:

including within the solution a. from 0.001% to 5% by weight of a saccharide surface active agent selected from the group consisting of alkyl saccharides and alkenyl-saccharides, and b. from 0.001% to 2% by weight of a non-ionic surfactant other than a saccharide, wherein quaternary ammonium compounds are not included within the solution.

19. The method of claim 18 wherein:

A is selected from the group consisting of —X, $—OR^1$, $—OR^{2A}OR^1$, $—N(R^1)_2$, $—OOCCH_3$, $—HNOCCH_3$, and —H, where X is a halide, $R^1$ is $R^2$ or hydrogen, $R^2$ is an alkyl group of 1 to 4 carbon atoms, and $R^{2A}$ is a divalent saturated hydrocarbon group of from 1 to 4 carbon atoms.

20. The method of claim 19 wherein:

the saccharide surface active agent has the formula:

$$R_{10}—O—(R_{12}O)_t—(G)_p$$

wherein $R_{10}$ is a linear or branched alkyl, alkenyl or alkylphenyl group having 6–18 carbon atoms, $R_{12}$ is an alkylene group having 2–4 carbon atoms, G is a reduced saccharide residue having 5–6 carbon atoms, t is 0–10, and p is 1–10.

* * * * *